United States Patent
Schnaufer et al.

(10) Patent No.: US 11,520,056 B2
(45) Date of Patent: *Dec. 6, 2022

(54) COMPUTING HEADINGS USING DUAL ANTENNAS WITH GLOBAL NAVIGATION SATELLITE SYSTEMS

(71) Applicant: Rockwell Collins, Inc., Cedar Rapids, IA (US)

(72) Inventors: Bernard A. Schnaufer, Marion, IA (US); Huan Phan, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,670

(22) Filed: Mar. 5, 2021

(65) Prior Publication Data

US 2021/0190972 A1 Jun. 24, 2021

Related U.S. Application Data

(63) Continuation of application No. 16/019,273, filed on Jun. 26, 2018, now Pat. No. 10,948,609.

(51) Int. Cl.
*G01S 19/55* (2010.01)
*G01S 19/40* (2010.01)

(52) U.S. Cl.
CPC .............. *G01S 19/55* (2013.01); *G01S 19/40* (2013.01)

(58) Field of Classification Search
None
See application file for complete search history.

(56) References Cited

U.S. PATENT DOCUMENTS 6,166,683 A 12/2000 Hwang
8,665,145 B2 3/2014 Dai et al.
(Continued)

FOREIGN PATENT DOCUMENTS

EP 2966477 A1 1/2016

OTHER PUBLICATIONS

Teunissen, P. J. G "The LAMBDA Method For the GNSS Compass", Artificial Satellites, vol. 41 2006, 15 pages.
(Continued)

*Primary Examiner* — Gregory C. Issing
(74) *Attorney, Agent, or Firm* — Suiter Swantz pc llo

(57) ABSTRACT

Systems and methods of heading determination with global navigation satellite system (GNSS) signal measurements are provided herein. A pair of antennas may be separated by a known baseline length and mounted on a vehicle. A GNSS receiver may obtain pseudorange and carrier phase measurements for GNSS satellites within view. An LRU may estimate carrier phase ambiguities and a two-dimensional vector, using the known baseline length and a linearized measurement model. The LRU may determine integer ambiguities using the estimated carrier phase ambiguities. The LRU may determine assumed wrong fixes of the integer ambiguities and a probability of almost fixed value. The LRU may store the set of integer ambiguities. The LRU may determine, from accumulated data over measurement epochs, updated integer ambiguities. The LRU may correct the carrier phase measurements using the updated integer ambiguities. The LRU may compute the heading using the corrected carrier phase measurements.

10 Claims, 3 Drawing Sheets

(56) References Cited

U.S. PATENT DOCUMENTS

| | | | |
|---|---|---|---|
| 8,830,121 B2 | 9/2014 | Vollath | |
| 9,035,826 B2 | 5/2015 | Ashjaee et al. | |
| 9,829,582 B2 | 11/2017 | Wu et al. | |
| 10,247,829 B2 | 4/2019 | Wu et al. | |
| 10,677,933 B1 | 6/2020 | Gavrilets et al. | |
| 2003/0112177 A1* | 6/2003 | Toda | G01S 19/44 342/357.27 |
| 2011/0090113 A1* | 4/2011 | Fenton | G01S 19/22 342/357.68 |
| 2017/0192103 A1* | 7/2017 | Kundak | G01S 19/05 |

OTHER PUBLICATIONS

Wu et al., "Geometry Extra-Redundant Almost Fixed Solutions: A High Integrity Approach for Carrier Phase Ambiguity Resolution for High Accuracy Relative Navigation", IEEE/ION Position, Location and Navigation System, May 2008, 15 pages.

\* cited by examiner

COMPUTING HEADINGS USING DUAL ANTENNAS WITH GLOBAL NAVIGATION SATELLITE SYSTEMS

CROSS-REFERENCE TO RELATED PATENT APPLICATIONS

This application is a continuation of U.S. application Ser. No. 16/019,273, filed Jun. 26, 2018, which is incorporated herein by reference in its entirety.

BACKGROUND

Signals received from global navigation satellite systems (GNSS) may be used to calculate a position and an altitude of a vehicle. Errors may be introduced into the calculations of the position and altitude due to various ambiguities arising from measurement of the signals.

SUMMARY

In one aspect, embodiments of the inventive concepts disclosed herein are directed to a method of heading determination of a vehicle with global navigation satellite system (GNSS) signal measurements. The method may include a GNSS receiver obtaining, a pair of antennas separated by a known baseline length and mounted on a vehicle, pseudorange and carrier phase measurements for GNSS satellites within view of the pair of antennas. The method may include estimating carrier phase ambiguities and a two-dimensional vector of the vehicle's heading and pitch, using the known baseline length and a linearized measurement model relating the pseudorange and carrier phase measurements to the carrier phase ambiguities, the heading and the pitch. The method may include determining a set of carrier phase integer ambiguities using the estimated carrier phase ambiguities. The method may include determining a set of assumed wrong fixes of the set of carrier phase integer ambiguities and a corresponding probability of almost fixed (PAF) value. The method may include storing, in memory, data for the current measurement epoch, comprising the set of carrier phase integer ambiguities. The method may determining, from accumulated data comprising the data stored for the current measurement epoch and data stored for at least one previous measurement epoch, a set of updated carrier phase integer ambiguities. The method may include correcting the carrier phase measurements obtained in the current measurement epoch, using the set of updated carrier phase integer ambiguities. The method may include computing the vehicle's heading using the corrected carrier phase measurements.

In some embodiments, and in accordance with the inventive concepts disclosed herein, the method may include obtaining the pseudorange and carrier phase measurements using a single GNSS frequency or using two GNSS frequencies. In some embodiments, the method may include storing, in the memory, the set of carrier phase integers if a wrong fix bias for the current measurement epoch is less than a defined threshold. In some embodiments, the method may include storing, in the memory, the set of carrier phase integer ambiguities if the corresponding PAF value is greater than a defined integrity threshold. In some embodiments, storing the data for the current measurement epoch may include storing the set of carrier phase integer ambiguities, the set of assumed wrong fixes of the set of carrier phase integer ambiguities, and the corresponding PAF value.

In some embodiments, and in accordance with the inventive concepts disclosed herein, the method may include identifying, from the accumulated data, a measurement epoch with a smallest wrong fix bias. In some embodiments, the method may include retrieving from the accumulated data, a set of assumed wrong fixes corresponding to the measurement epoch identified with the smallest wrong fix bias. In some embodiments, the method may include determining an updated wrong fix bias for space vehicle (SV) geometry of the current measurement epoch, using the retrieved set of assumed wrong fixes. In some embodiments, the method may include determining a heading protection level using the updated wrong fix bias. In some embodiments, the method may include applying the vehicle's heading to a navigation or positioning application of the vehicle, responsive to the heading protection level being less than a predefined threshold.

In a further aspect, embodiments of the inventive concepts disclosed herein are directed to a system for heading determination of a vehicle with global navigation satellite system (GNSS) signal measurements. The system may include a pair of antennas separated by a known baseline length and mounted on a vehicle. The system may include a GNSS receiver. The GNSS receiver may obtain pseudorange and carrier phase measurements for GNSS satellites within view of the pair of antennas, for a current measurement epoch. The system may include a line replaceable unit (LRU) of the vehicle. For the current measurement epoch, the LRU may estimate carrier phase ambiguities and a two-dimensional vector of the vehicle's heading and pitch, using the known baseline length and a linearized measurement model relating the pseudorange and carrier phase measurements to the carrier phase ambiguities, the heading and the pitch. The LRU may determine a set of carrier phase integer ambiguities using the estimated carrier phase ambiguities. The LRU may determine a set of assumed wrong fixes of the set of carrier phase integer ambiguities and a corresponding probability of almost fixed (PAF) value. The LRU may store, in memory, data for the current measurement epoch, comprising the set of carrier phase integer ambiguities. The LRU may determine, from accumulated data comprising the data stored for the current measurement epoch and data stored for at least one previous measurement epoch, a set of updated carrier phase integer ambiguities. The LRU may correct the carrier phase measurements obtained in the current measurement epoch, using the set of updated carrier phase integer ambiguities. The LRU may compute the vehicle's heading using the corrected carrier phase measurements.

In some embodiments, and in accordance with the inventive concepts disclosed herein, the GNSS receiver may obtain the pseudorange and carrier phase measurements using a single GNSS frequency or using two GNSS frequencies. In some embodiments, the LRU may store, in the memory, the set of carrier phase integers if a wrong fix bias for the current measurement epoch is less than a defined threshold. In some embodiments, the LRU may store, in the memory, the set of carrier phase integer ambiguities if the corresponding PAF value is greater than a defined integrity threshold. In some embodiments, the LRU may store the data for the current measurement epoch by storing the set of carrier phase integer ambiguities, the set of assumed wrong fixes of the set of carrier phase integer ambiguities, and the corresponding PAF value.

In some embodiments, and in accordance with the inventive concepts disclosed herein, the LRU may identify, from the accumulated data, a measurement epoch with a smallest wrong fix bias. In some embodiments, the LRU may retrieve from the accumulated data, a set of assumed wrong fixes corresponding to the measurement epoch identified with the smallest wrong fix bias. In some embodiments, the LRU may determine an updated wrong fix bias for space vehicle (SV) geometry of the current measurement epoch, using the retrieved set of assumed wrong fixes. In some embodiments, the LRU may determine a heading protection level using the updated wrong fix bias. In some embodiments, the LRU may apply the vehicle's heading to a navigation or positioning application of the vehicle, responsive to the heading protection level being less than a predefined threshold.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
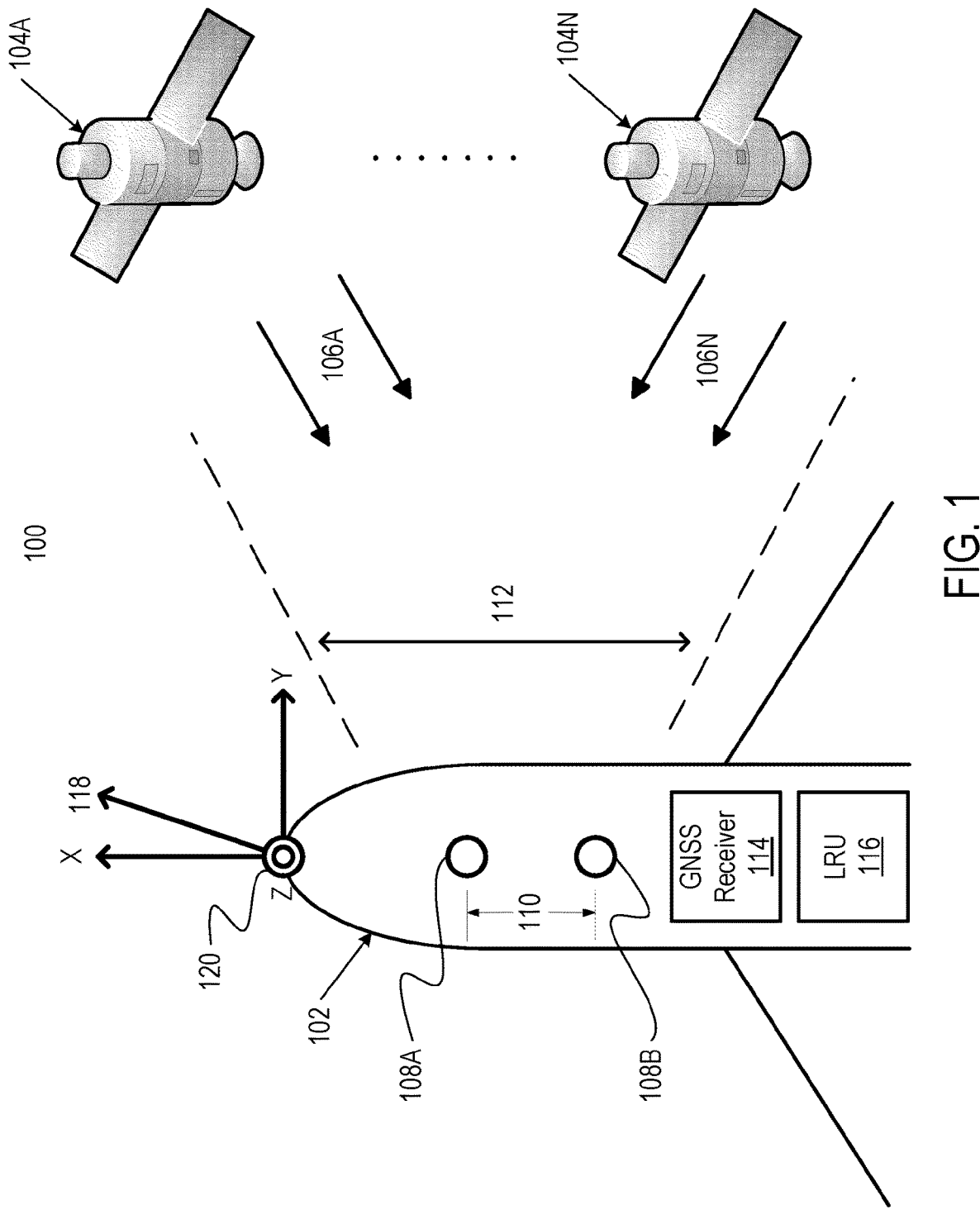
FIG. 1 is a block diagram of a system for heading determination of a vehicle with global navigation satellite system (GNSS) signal measurements, in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to a system, a method, a device, or an apparatus for heading determination of a vehicle with global navigation satellite system (GNSS) signal measurements. To determine a heading of a vehicle using GNSS signal measurements, dual antennas may be installed along a body axis of the vehicle. Using a baseline vector between two antennas in local level frame, the orientation of the baseline vector relative to a specified cardinal direction (e.g., north) may determine the heading of the vehicle. Accuracy of the computed heading angle may depend on an error level of the baseline vector solution as well as the baseline length between the two antennas. For a given error level, the longer the baseline length, the smaller the calculated heading error may be, and vice-versa. For a specific baseline length, differential global positioning system (DGPS) techniques may be used to compute high accuracy GPS carrier phase based solutions to decrease errors in the computed baseline vector and to increase accuracy in the estimation of the heading.

To use GPS carrier phases in computing carrier phase based solutions, Real Time Kinematics (RTK) techniques may be used to resolve integer ambiguities in GPS carrier phase measurements. The baseline solution with the resolved integer ambiguities may be calculated to estimate the heading from the computed baseline solution. As such, the integrity in the estimate of the heading may depend on the integrity of the baseline solution. The integrity of the baseline solution in turn may depend on the confidence or trust level obtained when resolving the carrier phase integer ambiguities.

In certain RTK techniques, such as Bootstrapping or Integer Least Square (ILS), the trust level may depend on the probability of correct fix (PCF) associated with the integer ambiguity resolution process. The PCF may correspond to a probability that the integer ambiguities are resolved correctly and may be computed by integrating the float solution probabilistic distribution over the pull in region (PIR). The PCF, itself, may depend on a space vehicle (SV) geometry and strength of the measurement model. When PCF is high, it may be more likely that that the integer ambiguities are resolved correctly, yielding a heading solution with both high accuracy based on carrier phase measurements and high integrity based on the very high confidence level associated with the integer ambiguity resolution process. If dual-frequency GPS measurements are provided then the dual-frequency measurement model may provide a high PCF that can satisfy both high accuracy and high integrity specifications (e.g., for aeronautical applications) directly. When only single-frequency GPS measurements are available, however, in general the PCF may be low and may not be able to satisfy high accuracy and high integrity specifications.

One technique to improve integrity of the integer ambiguity resolution process may be to compute the almost fixed solution and the associated probability of almost fix (PAF). The PAF may be computed by integrating the float solution probabilistic distribution over the PIR and a set of expanded pull in regions (EPIR) corresponding to the assumed, hypothetical incorrect fixes. The solution with consideration of the assumed wrong fixes may be called the "almost fixed solution," and the trust level of the almost fixed solution may be represented by the PAF. In general, for high accuracy and high integrity applications, the PCF may be used to satisfy accuracy specifications. The PAF may be used to satisfy integrity specifications. The PAF may be a sum of the PCF and the EPIR. As more and more EPIRs are considered, the PAF may become higher and higher (approaching 100%) at the expense of larger and larger solution biases due to assumed wrong fixes. The assumed solution biases, in turn, may drive the protection level to be higher and higher to the point that it might exceed an alert limit, rendering the solution unavailable. The protection level for the almost fixed solution may be defined as the sum of a wrong fix bias and some Gaussian component due to carrier phase error.

The carrier phase error component may be small compared to wrong fix biases and may not drive either the protection level or system availability. To keep the number of included EPIRs relatively small, a high PCF and high probability distribution may be used for regions of small assumed wrong fixes (+/−1 cycles). In general, this may not be the case when the measurement model is not strong enough (e.g., when single frequency is available), especially during poor SV geometries.

To improve PCF for single frequency applications, the measurement model may be enhanced by leveraging the known baseline length between the dual antennas. The baseline length equation, however, may be nonlinear and therefore may be linearized via a coordinate transformation. The baseline length equation in a local level frame may be of the form:

$$b(y, p) = l * \begin{pmatrix} \sin(y)\cos(p) \\ \cos(y)\cos(p) \\ \sin(p) \end{pmatrix}$$

Where b is the baseline vector in the local level frame (with baseline length l), y is the heading angle in radian, p is the pitch angle in radian then. Linearizing the baseline vector around the estimated heading and pitch angles $y_0$ and $p_0$ may yield:

$$b(y, p) = b(y_0 + p_0) + C(y_0, p_0) * \begin{pmatrix} \Delta y \\ \Delta p \end{pmatrix}$$

where:

$$C(y_0, p_0) = \begin{pmatrix} \cos(y_0)\cos(p_0) & -\sin(y_0)\sin(p_0) \\ -\sin(y_0)\cos(p_0) & -\cos(y_0)\sin(p_0) \\ 0 & \cos(p_0) \end{pmatrix}$$

The measurement equation for the local level frame may be defined as:

$$z = Aa + Bb + n$$

where A is the diagonal matrix of carrier wavelength, B is the matrix of line of sight vectors, a is the vector of carrier phase integer ambiguities, z is the GPS measurement vector, and n is the noise vector. With the linearized measurement vector defined as:

$$\Delta z = z - B * b(y_0, p_0)$$

the linear measurement equation may become:

$$\Delta z = Aa + B * C(y0, p0)^* \begin{pmatrix} \Delta y \\ \Delta p \end{pmatrix}$$

Using the enhanced measurement model represented above, the PCF may be increased compared to the PCF value obtained from either the Bootstrapping or the ILS methods.

The almost fixed solution and the enhanced measurement model may satisfy high accuracy and high integrity specifications during good SV geometries. However, when the SV geometry is poor, the PCF may degrade, thereby significantly affecting accuracy. At the same time, due to the degraded PCF, more and more EPIRs may be taken into account to satisfy high integrity specifications. This may lead to higher wrong fix biases and larger protection levels and hence significant impact on system availability (when protection level exceeds the alert limit).

To increase PCF even further to satisfy either high accuracy or high integrity specifications with reasonable system availability, the carrier phase based hold solution may be computed from a set of integer ambiguities that may be selected from the sets of snapshot integer ambiguities and held for reuse in subsequent measurement epochs. For every measurement epoch, a snapshot integer ambiguity resolution process may be carried out using the Bootstrapping method. The resulting integer ambiguities, associated PAF, and associated wrong fixes for the respective integer ambiguities may be stored in a buffer, when the integrity specifications are satisfied. After a certain number of measurement epochs, the saved integer ambiguities may be compared for correctness and consistency. A common integer ambiguity set across a majority of the measurement epochs may be saved and used in the hold solution.

Assuming no carrier phase cycle slips, since the common set of integer ambiguities of the hold solution may be the same across the different measurement epochs, any set of the associated PCF, PAF and wrong fixes computed for the corresponding individual snapshot solutions can be used as parameters to characterize integrity of the common set. To obtain the highest accuracy and maximum integrity, the integrity parameters for the snapshot solution with smallest wrong fix bias that are computed with the best SV geometry and the most number of SVs may be used. In this manner, the hold solution can play through accuracy and integrity outages when either accuracy or integrity is not satisfying specifications due to poor SV geometry or lower number of SVs.

Integrity parameters may be computed for the almost fixed hold solution, using n measurement epochs with PCF values greater than the specified accuracy threshold, PAF values greater than the specified integrity threshold, and wrong fix biases less than the specified alert limit. For the n measurement epochs, there may be a set of m common integer ambiguities compared, saved, and used in the hold solution, a set of PCFs associated with n snapshot solutions, and a set of PAFs associated with the n snapshot solutions. For a snapshot solution i of the n measurement epochs, there may be k EPIRs considered in the almost fixed solution and k by m set of hypothetical wrong fixed vectors (in the common m integer ambiguities) associated with the respective k EPIRs.

At measurement epoch i, with a confidence level of $PCF_i$ is that the snapshot integer ambiguity set is fixed correctly and a confidence level of $PAF_i$ if the set is fixed incorrectly, then the snapshot integer ambiguity set may have the wrong fixes in the assumed k EPIRs. The assumed k EPIRs may correspond to the individual wrong fix vectors at least containing the corresponding k wrong fix vectors of the common integer ambiguity set. At the current measurement epoch, the integer ambiguities in the common set may be numerically equal to those in the buffered snapshot solution. Furthermore, there may no carrier phase cycle slip in the buffered snapshot solutions as the integer ambiguities have not changed. Thus, the confidence levels $PCF_i$ and $PAF_i$ obtained at measurement epoch i can still be applied for the current measurement epoch. However, the wrong fix bias may be different since SV geometry has been changed. The wrong fix bias caused by the assumed wrong fixes for the snapshot i may be expressed as:

$$Bias_i = \max(S^*(w_{11}, w_{12}, \ldots, w_{1m}), S^*(w_{21}, w_{22}, \ldots, w_{2m}), \ldots, S^*(w_{k1}, w_{k2}, \ldots, w_{km}))$$

where S is the gain matrix that transforms the assumed wrong fixes to heading error, and $(w_{11}, w_{12}, \ldots, w_{1m})$, $(w_{21},$ $w_{22}, \ldots, w_{2m}), \ldots (w_{k1}, w_{k2}, \ldots, w_{km})$ are the set of hypothetical wrong fix vectors for the snapshot i. The wrong fix bias for the hold solution may be calculated in the following format:

Bias=min(Bias$_1$, Bias$_2$, ..., Bias$_n$)=Bias$_j$

With the optimal measurement epoch j identified, the PCF and PAF can be set to those associated with j:

PCF=PCF$_j$

PAF=PAF$_j$

Since wrong fix bias is computed as the minimum of wrong fix biases obtained when there is good SV geometry with less number of EPIRs and less wrong fixes in each EPIR, the resulting wrong fix bias may be improved for the hold solution. This may lead to smaller protection levels and hence higher system availability. Similarly, since the PCF and PAF are associated with the smallest wrong fix bias and computed when there is good SV geometry and more number of SVs, both the PCF and PAF may also be improved for the hold solution.

Referring now to FIG. 1, depicted is one embodiment of a system 100 for heading determination of a vehicle with global navigation satellite system (GNSS) signal measurements. In brief overview, the system 100 may include a vehicle 102 and one or more satellites 104A-N of the GNSS. The vehicle 102 maybe an automobile, a sedan, a train, a rocket, a sled, a truck, a vessel, a watercraft, a drone, an airplane (as depicted in FIG. 1), and a dirigible, among others. The vehicle 102 may include portable pointing systems to identify vehicle orientation or direction relative to a target destination. The vehicle 102 may be stationary, or may be moving or travelling along a surface of the Earth. The vehicle 102 may include dual antennas 108A and 108B, at least one GNSS receiver 114, and at least one line-replaceable unit (LRU) 116, among other components. The dual antennas 108A and 108B may be mounted on the vehicle 102. The dual antennas 108A and 108B may be separated by a baseline length 110 from each other lengthwise on the vehicle 102. The dual antennas 108A and 108B may receive signals 106A-N transmitted from the one or more satellites 104A-N within view 112 of the dual antennas 108A and 108B.

By processing the signals 106A-N received via the dual antennas 108A and 108B, the GNSS receiver 114 and the LRU 116 may calculate an orientation of the vehicle 102 on the x-y-z plane, such as heading 118 and a pitch 120. The heading 118 may be relative to the direction of the vehicle 102 in the x-y plane. The pitch 120 may be relative to a height of the vehicle 102 along the x-z or y-z plane. The GNSS receiver 114 may receive the signals 106A-N via the dual antennas 108A and 108B from the one or more satellites 104A-N within the view 112 of the dual antennas 108A and 108B. For each antenna 108A and 108B, the GNSS receiver 114 may obtain a pseudorange measurement and a carrier phase measurement for each sample period (sometimes referred to as a measurement epoch). The pseudorange measurement may be an estimated distance between the corresponding antenna 108A and 108B and the respective satellite 104A-N. The carrier phase measurement may be an estimated number of cycles of the carrier frequency of the signal 106A-N between the corresponding antenna 108A and 108B and the respective satellite 104A-N.

For the measurement epoch, the LRU 116 may calculate a difference between the pseudorange measurements from each of the dual antennas 108A and 108B (referred to as a double-difference pseudorange (DDPR) measurement). The LRU 116 may calculate a difference between the carrier phase measurements from each of the dual antennas 108A and 108B (referred to as a double-difference carrier phase (DDCP) measurement) for the same measurement epoch. The double-difference carrier phase measurements may be less noisy than the double-difference pseudorange measurement. The double-difference pseudorange measurement, however, may have integer ambiguities that are to be resolved for calculating and estimating the heading 118 and the pitch 120 of the vehicle 102. A baseline vector component and integer ambiguities may be resolved by the LRU 116 using the double-difference measurements between the dual antennas 108A and 108B. The resolution may be in accordance with the following mathematical formula:

$$\begin{bmatrix} DDPR \\ DDCP \end{bmatrix} = \begin{bmatrix} dH & 0 \\ dH & \lambda I \end{bmatrix} \begin{bmatrix} \underline{b} \\ \underline{H} \end{bmatrix} + \begin{bmatrix} \varepsilon_{PR} \\ \varepsilon_{CP} \end{bmatrix}$$

where $\underline{b}$ is a three-dimensional baseline vector, $\overline{N}$ is the vector of integer ambiguities, $\lambda$ is the GPS L1 wavelength (approximately 19.0 cm) and $\varepsilon_{PR}$ and $\varepsilon_{CP}$ are noise components for the double-difference measurements.

Under one technique, the measurement equation may be solved by the LRU 114 using the following formula:

$$\begin{bmatrix} \underline{b}_{est} \\ \underline{N}_{est} \end{bmatrix} = P_{INIT} H' (H P_{INIT} H' + R)^{-1} \begin{bmatrix} DDPR \\ DDPR \end{bmatrix}$$

where $\underline{b}_{est}$ is the estimated float baseline solution, $\underline{N}_{est}$ is the estimated integer ambiguity solution, $P_{INIT}$ is the initial covariance, R is measurement variance matrix, and H is defined as $$H = \begin{bmatrix} dH & 0 \\ dH & \lambda I \end{bmatrix}$$

The solutions of $\underline{b}_{est}$ and $\underline{N}_{est}$ may be referred collectively as the float solution, because the estimated integers may not be constrained to integer values and instead may be computed from the least squares solution. From the estimated integer ambiguity of the float solution, the LRU 114 may employ a resampling technique (e.g., bootstrapping) to compute best integer ambiguity values. The LRU 114 may calculate the PCF value for each integer ambiguity value. The LRU 114 may compute a corrected double-difference carrier phase as a difference between the double-difference carrier phase and a vector of best integer ambiguity values ($\underline{N}_{est,int}$). Based on the corrected double-difference carrier phase, the LRU 114 may calculate a fixed baseline vector ($\underline{b}$). The LRU 114 may project the fixed baseline vector onto a local level horizontal coordinate frame and use the East and North components of the projected vector to compute the heading 118 of the vehicle 102. The LRU 114 may also use the PCF and the noise statistics of the double-difference carrier phase measurements ($\varepsilon_{PR}$ and $\varepsilon_{CP}$) to calculate a heading protection level for the vehicle 102. With this technique, however, the resultant PCF value may likely be too low to satisfy heading protection levels specified for commercial aviation integrity.

To increase the resultant PCF value, the LRU 114 may reduce the number of unknowns in the baseline vector from three to two by performing a linearization step. With the linearization step, the measurement equation may be solved by the LRU 114 using the following formula:

$$\begin{bmatrix} \Delta DDPR \\ \Delta DDCP \end{bmatrix} = \begin{bmatrix} dH * C & 0 \\ dH * C & \lambda I \end{bmatrix} \begin{bmatrix} \underline{\alpha} \\ \underline{N} \end{bmatrix} + \begin{bmatrix} \varepsilon_{PR} \\ \varepsilon_{CP} \end{bmatrix}$$

where $\underline{\alpha}$ is the two-dimensional (as opposed to three-dimensional) heading and pitch delta vector, $\underline{N}$ is the vector of integer ambiguities, $\lambda$ is the GPS L1 wavelength (approximately 19.0 cm), C is the heading and pitch linearization matrix, and $\varepsilon_{PR}$ and $\varepsilon_{cp}$ are noise components for the $\Delta$DD measurements.

With the number of unknowns reduced, the measurement equation may be solved by the LRU 114 using the following formula:

$$\begin{bmatrix} \underline{\alpha}_{est} \\ \underline{N}_{est} \end{bmatrix} = P_{INIT} H' (H P_{INIT} H' + R)^{-1} \begin{bmatrix} \Delta DDPR \\ \Delta DDPR \end{bmatrix}$$

where $\underline{\alpha}_{est}$ is the estimated float heading and pitch delta solution, $\underline{N}_{est}$ is the estimated integer ambiguity solution, $P_{INIT}$ is the initial covariance, R is measurement variance matrix, and H is defined as:

$$H = \begin{bmatrix} dH * C & 0 \\ dH * C & \lambda I \end{bmatrix}$$

From the estimated integer ambiguity of the float solution, the LRU 114 may employ a resampling technique (e.g., bootstrapping) to compute best integer ambiguity values. The LRU 114 may calculate the PAF value for each integer ambiguity value. The LRU 114 may compute a corrected delta double-difference carrier phase ($\Delta$DDCP) as a difference between the double-difference carrier phase and a vector of best integer ambiguity values ($\underline{N}_{est,int}$). Based on the corrected delta double-difference carrier phase, the LRU 114 may calculate a fixed heading and pitch delta vector ($\underline{\alpha}$). The LRU 114 may calculate the heading 118 of the vehicle 102 from the fixed delta heading and the heading linearization value. The LRU 114 may use the PAF and the noise statistics of the double-difference carrier phase measurements ($\varepsilon_{PR}$ and $\varepsilon_{CP}$) to calculate a heading protection level for the vehicle 102. The LRU 114 may then use the almost fixed processing to compute a hold integer ambiguity value and the hold PAF to apply in subsequent measurement epochs. The LRU 114 may calculate a hold solution for the heading 118 and a hold heading protection level value.

Figure 2:
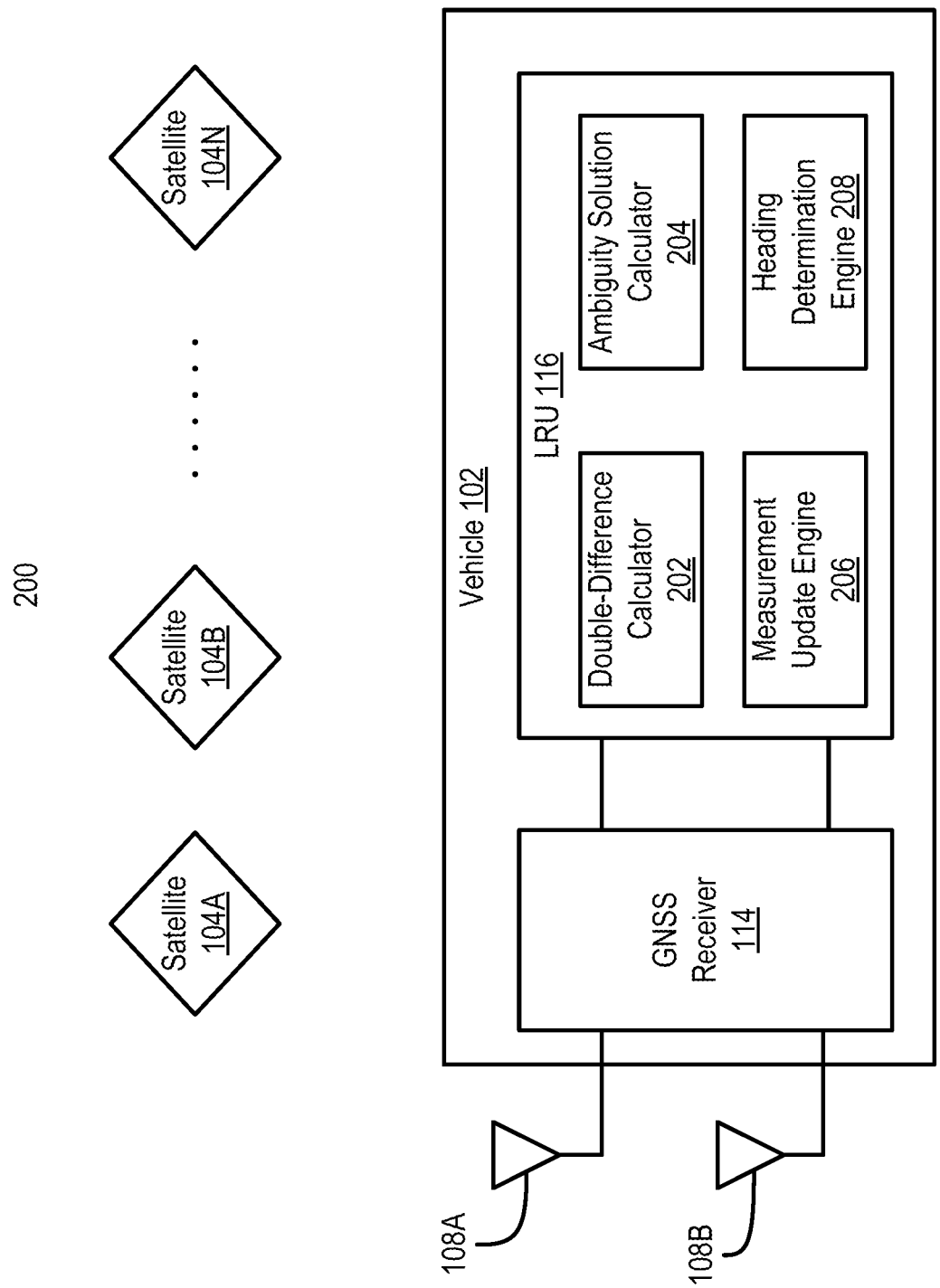
FIG. 2 shows a block diagram of a system architecture for heading determination of a vehicle with global navigation satellite system (GNSS) signal measurements, in accordance with some embodiments of the inventive concepts disclosed herein.

Referring now to FIG. 2, depicted is a block diagram of an architecture for a system 200 for heading determination of a vehicle with global navigation satellite system (GNSS) signal measurements. The system 200 may include one or more components of system 100 as detailed above, such as the vehicle 102 and the one or more satellites 104A-N (hereinafter generally referred to as satellite 104). The vehicle 102 may include or may be installed with the dual antennas 108A and 108B, the GNSS receiver 114, and the LRU 116 all communicatively coupled to one another for example. The LRU 116 may further include a double-difference calculator 202, an ambiguity solution calculator 204, a measurement update engine 206, and/or a heading determination engine 208, among others. In some embodiments, the functionalities of the double-difference calculator 202, the ambiguity solution calculator 204, the measurement update engine 206, and the heading determination engine 208 may be performed by multiple LRUs 116 installed in the vehicle 106.

Each of the components (e.g., the GNSS receiver 114 and the LRU 116) listed above may include at least one processor. The processors may include a microprocessor unit, an application-specific integrated circuit (ASIC), and a field-programmable gate array (FPGA), among others. The processors may also be a multi-core processor or an array of processors. The memory in each above mentioned device or component may include electronic, optical, magnetic, or any other storage device capable of relaying or providing the processor with program instructions. The memory may include, for example, include a floppy disk, CD-ROM, DVD, magnetic disk, memory chip, Static random access memory (SRAM), Burst SRAM or SynchBurst SRAM (BSRAM), Dynamic random access memory (DRAM), Ferroelectric RAM (FRAM), NAND Flash, NOR Flash, and Solid State Drives (SSD), among others, or any combination thereof. The program instructions may include code from any programing language, such as C, C++, C#, Java, JavaScript, Perl, HTML, XML, Python, Visual Basic, et cetera, or any combination thereof.

In accordance to GNSS protocols, each satellite 104 may transmit or broadcast a signal 106A-N (hereinafter generally referred as signal 106). The signal 106 may have a carrier frequency, a wavelength, an encoding, and a modulation, among other characteristics as specified by the GNSS protocol. The carrier frequencies may be a multiple of a fundamental frequency set by the GNSS protocol. The fundamental frequency may be 10.23 MHz. The messages encoded in the signal 106 may include a status message and ephemeris data. The ephemeris data may indicate a position of the satellite 104 in orbit around the Earth. In some embodiments, the signal 106 transmitted by the satellite 104 may be an L1 GPS signal, and may have a carrier frequency of 1575.42 MHz (10.23 MHz×154) and a wavelength of 19.0 cm. In some embodiments, the signal 106 transmitted by the satellite 104 may be a L2 GPS signal, and may have a carrier frequency of 1227.60 MHz (10.23 MHz×120) and a wavelength of 24.4 cm. In some embodiments, the signal 106 transmitted by the satellite 104 may be a L5 GPS signal, and may have a carrier frequency of 1176.45 MHz (10.23 MHz×115) and may have a wavelength of 25.48 cm.

The dual antennas 108A and 108B may receive the one or more signals 106 from the one or more corresponding satellites 104 within the view 112 of the dual antennas 108A and 108B. The dual antennas 108A and 108B may be mounted on the vehicle 102, and may be separated by the baseline length 110. In some embodiments, the dual antennas 108A and 108B may be mounted length-wise, width-wise, or height-wise on the vehicle 102. In some embodiments, the dual antennas 108A and 108B may be mounted length-wise on the vehicle 102. The baseline length 110 may range from 5 cm to 350 m. Each of the dual antennas 108A and 108B may be a half-wave dipole, a dipole antenna (e.g., corner reflector or log-periodic), a monopole antenna (e.g., whip, mast, umbrella, or inverted F), a travelling wave antenna (e.g., helical or spiral), reflector antenna (e.g., corner or parabolic), an aperture antenna (e.g., parabolic, slot, horn, or dielectric), a microstrip antenna, an array antenna (e.g., phased array antenna, electronically scanned array (ESA) with a phase shifter, collinear array, planar array, and conformal array), or a loop antenna, among others, or any combination thereof.

From each of the dual antennas 108A and 108B, the GNSS receiver 114 may obtain pseudorange measurements and carrier phase measurements for the one or more satellites 104 within the view 112 of the dual antennas 108A and 108B. The pseudorange measurement may be an approximated distance from the antenna 108A or 108B to the satellite 104 corresponding to the received signal 106. The carrier phase measurement may be a number of cycles in the signal 106 between the antenna 108A or 108B and the satellite 104 corresponding to the received signal 106. In some embodiments, the pseudorange measurements and carrier phase measurements may be obtained by the GNSS receiver 114 at measurement epochs. The measurement epoch may be a sampling interval for obtaining the pseudorange measurements and carrier phase measurements of the signals 106 of the satellites 104 within the view 112 received via the dual antennas 108. In some embodiments, the sampling interval may range from a few hundredths of a second to hours. In some embodiments, the GNSS receiver 114 may calculate, determine, or otherwise obtain the pseudorange measurements and carrier phase measurements based on the signals 106 received from the one or more satellites 104. In some embodiments, the signals 106 may have a single carrier frequency. In some embodiments, the signals 106 may have dual or multiple carrier frequencies (e.g., L1 and L5).

In some embodiments, the GNSS receiver 114 may obtain a first pseudorange measurement and a first carrier phase measurement via the first antenna 108A. The first pseudorange measurement may be an estimated distance between the first antenna 108A and the satellite 104 corresponding to the received signal 106 within the view 112 of the first antenna 108A. The first carrier phase measurement may be a number of cycles in the signal 106 between the first antenna 108A to the satellite 104 corresponding to the received signal 106. In some embodiments, the GNSS receiver 114 may obtain a second pseudorange measurement and a second carrier phase measurement via the second antenna 108B. The second pseudorange measurement may be an estimated distance between the second antenna 108B and the satellite 104 corresponding to the received signal 106 within the view 112 of the second antenna 108B. The second carrier phase measurement may be a number of cycles in the signal 106 between the second antenna 108B and the satellite 104 corresponding to the received signal 106.

For each measurement epoch, the double-difference calculator 202 of the LRU 116 may calculate or determine a difference between the pseudorange measurements for the satellites 104 within view 112 of the dual antennas 108A and 108B. In some embodiments, the double-difference calculator 202 may determine a difference between the first pseudorange measurement for the first antenna 108A and the second pseudorange measurement for the second antenna 108B. The difference between the first pseudorange measurement and the second pseudorange measurement may be referred to as a double-difference pseudorange (DDPR) measurement. The double-difference calculator 202 of the LRU 116 may calculate or determine a difference between the carrier phase measurements for the satellites 104 within view 112 of the dual antennas 108A and 108B. In some embodiments, the double-difference calculator 202 may determine a difference between the first carrier phase measurement for the first antenna 108A and the second carrier phase measurement for the second antenna 108B. The difference between the first carrier phase measurement and the second carrier phase measurement may be referred to as a double-difference carrier phase (DDCP) measurement.

Using the baseline length 110 between the dual antennas 108A and 108B and a linearized measurement model, the ambiguity solution calculator 204 of the LRU 116 may calculate, determine, or estimate carrier phase ambiguities for the satellites 104 for the measurement epoch. In addition, the ambiguity solution calculator 204 may also calculate, determine, or estimate a two-dimensional orientation vector. The carrier phase ambiguities may be a float value, and may correspond to a fixed offset in the number of cycles in the signal 106 between the antenna 108A or 108B to the satellite 104 corresponding to the received signal 106. The two-dimensional orientation vector may include the heading 118 and the pitch 120 of the vehicle 102. The linearized measurement model may relate the pseudorange measurements and the carrier phase measurements from the GNSS receiver 114 to the carrier phase ambiguities for the satellite 104 and the heading 118 and the pitch 120 of the vehicle 102. In some embodiments, the ambiguity solution calculator 204 may reduce a number of unknowns between pseudorange measurements and the carrier phase measurements from the GNSS receiver 114 to the carrier phase ambiguities (e.g., from three variables to two). In some embodiments, the ambiguity solution calculator 204 may determine the carrier phase ambiguities using the least squares solution on the baseline length 110, the linearized measurement model, the double-difference carrier phase, and the double-difference pseudorange.

From the estimated carrier phase ambiguities, the ambiguity solution calculator 204 may calculate, identify, or otherwise determine a set of carrier phase integer ambiguities. Each estimated carrier phase ambiguity may be a float value, whereas each carrier phase integer ambiguity may be an integer value. The carrier phase integer ambiguity may correspond to a fixed offset in the number of cycles in the signal 106 between the antenna 108A or 108B and the satellite 104 corresponding to the received signal 106 for the corresponding measurement epoch. In some embodiments, the ambiguity solution calculator 204 may apply a resampling technique on the estimated carrier phase ambiguities to determine the set of carrier phase integer ambiguities. The resampling techniques may include a jackknifing technique, a bootstrapping technique, a cross-validation technique, or permutation test, among others. In some embodiments, the ambiguity solution calculator 204 may determine the set of carrier phase ambiguities based on an initial covariance and a predefined measurement variance for the GNSS receiver 114 in conjunction with the resampling technique.

For the set of carrier phase integer ambiguities, the measurement update engine 206 of the LRU 116 may calculate or determine a set of assumed wrong fixes and wrong fix biases. Each assumed wrong fix may correspond or indicate which of the carrier phase integer ambiguities could deviate from the actual carrier phase for the signal 106 of the satellite for the corresponding measurement epoch. In some embodiments, the measurement update engine 206 may determine the wrong fix bias based on the set of assume wrong fixes and a mapping function which depends on SV geometry. In some embodiments, the wrong fix bias caused by the assumed wrong fixes for the snapshot i may be expressed as:

$$\text{Bias}_i = \max(S^*(w_{11}, w_{12}, \ldots, w_{1m}), S^*(w_{21}, w_{22}, \ldots, w_{2m}), \ldots, S^*(w_{k1}, w_{k2}, \ldots, w_{km}))$$

where S is the gain matrix that transforms the assumed wrong fixes to heading error, and $(w_{11}, w_{12}, \ldots, w_{1m})$, $(w_{21}, w_{22}, \ldots, w_{2m})$, $\ldots$ $(w_{k1}, w_{k2}, \ldots, w_{km})$ are the set of hypothetical wrong fix vectors for the snapshot i.

The measurement update engine 206 may calculate or determine a probability of almost fixed (PAF) value for the set of carrier phase integer ambiguities. The PAF value may be for the corresponding measurement epoch. In some embodiments, the measurement update engine 206 may determine the PAF value based on the set of assumed wrong fixes. In some embodiments, the measurement update engine 206 may identify one or more pull-in regions (PIRs) for the set of carrier phase ambiguities. In some embodiments, the measurement update engine 206 may identify one or more extended pull-in regions (EPIRs) for the set of assumed wrong fixes. In some embodiments, the measurement update engine 206 may calculate or determine a distribution of estimated carrier phase ambiguities over the PIRs. In some embodiments, the measurement update engine 206 may calculate the PAF value by integrating the distribution of the estimated carrier phase ambiguities over the PIRs and EPIRs.

The measurement update engine 206 may store data for the current measurement epoch into memory. The memory may be part of the LRU 116 or may be otherwise accessible from the LRU 116. The data may include the set of carrier phase integer ambiguities determined from the estimated carrier phase ambiguities. In some embodiments, the data may also include the set of assumed wrong fixes, the PAF value, and the wrong fix bias for the set of carrier phase integer ambiguities for each measurement epoch. In some embodiments, the measurement update engine 206 may store data responsive to determining that the wrong fix bias for the corresponding measurement epoch is less than a defined threshold. In some embodiments, the measurement update engine 206 may store the data, responsive to determining that the PAF value is greater than an integrity threshold. The data may be stored and accumulated by the measurement update engine 206 over successive measurement epochs into the memory.

Using the data accumulated over successive measurement epochs into the memory, the measurement update engine 206 may generate or determine a set of updated carrier phase integer ambiguities. At each measurement epoch, the measurement update engine 206 may traverse and search the accumulated data stored on the memory across successive measurement epochs. In some embodiments, the measurement update engine 206 may determine the set of updated (or best) carrier phase integers using the estimated carrier ambiguities over the successive measurement epochs. In some embodiments, the measurement update engine 206 may identify a subset of the data from the accumulated data with the smallest wrong fix bias. In some embodiments, the measurement update engine 206 may retrieve the set of assumed wrong fixes corresponding to the measurement epoch with the smallest wrong fix bias. Using the set of assumed wrong fixes corresponding to the measurement epoch with the smallest wrong fix bias, the measurement update engine 206 can calculate or determine the set of updated carrier phase integer ambiguities.

In a current measurement epoch, the measurement update engine 206 may correct the carrier phase measurements of the current measurement epoch using the set of updated carrier phase integer ambiguities. The carrier phase measurements may be a float value, and may also correspond to an estimated number of cycles in the signal 106. Using the updated carrier phase integer ambiguities, the measurement update engine 206 may determine the corrected carrier phase measurements by subtracting the updated carrier phase integer ambiguities from the double-differenced carrier phase measurements. The measurement update engine 206 may also calculate or determine an updated wrong fix bias using the retrieved set of wrong fixes. In some embodiments, the wrong fix bias may be particular for the space vehicle (SV) geometry between the dual antennas 108A and 108B and the satellites 104. In some embodiments, the measurement update engine 206 may determine the updated wrong fix bias based on the updated set of corrected phase integer ambiguities.

The heading determination engine 208 of the LRU 116 may determine or compute the heading 118 of the vehicle 102 using the corrected carrier phase measurements. In some embodiments, the heading determination engine 208 may determine the pitch 120 of the vehicle using the corrected carrier phase measurements. In some embodiments, the heading determination engine 208 may apply the inverse of the linearized measurement model to determine the corrected heading 118 and/or the pitch 120. The heading determination engine 208 may calculate or determine a heading protection level using the updated wrong fix bias. The heading protection level may indicate a level of confidence in the determination of the heading 118 or the pitch 120, or both, for the vehicle 102. In some embodiments, the heading determination engine 208 may calculate or determine the heading protection level using the PAF value for the updated set of wrong fixes. In some embodiments, the heading determination engine 208 may set or apply the heading 118 of the vehicle 102 to a navigation or positioning of the vehicle 102, responsive to determining that the heading protection level is greater than the defined threshold.

Figure 3:
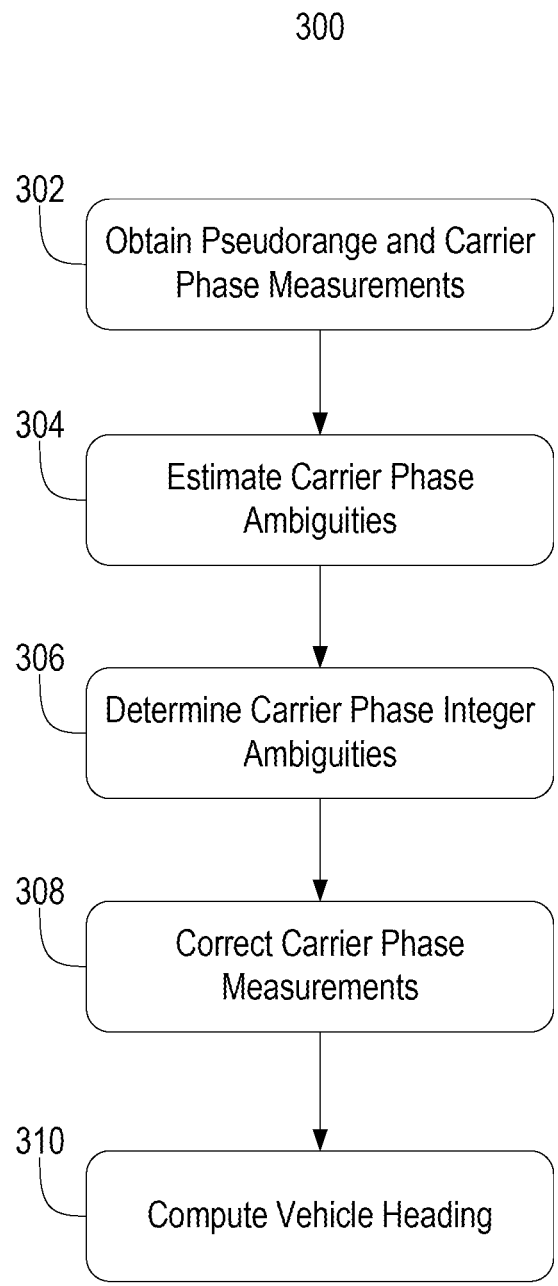
FIG. 3 shows a flow diagram of a method for heading determination of a vehicle with global navigation satellite system (GNSS) signal measurements, in accordance with some embodiments of the inventive concepts disclosed herein.

Referring now to FIG. 3, depicted is a flow diagram of method 300 of heading determination of a vehicle with global navigation satellite system (GNSS) signal measurements. The method 300 may be performed or implemented using the components detailed above in conjunction with FIGS. 1 and 2. In brief overview, a GNSS receiver may obtain pseudorange and carrier phase measurements (302). A line-replaceable unit (LRU) may estimate carrier phase ambiguities (304). The LRU may determine carrier phase integer ambiguities (306). The LRU may correct carrier phase measurements (308). The LRU may compute a vehicle heading (310).

In further detail, a GNSS receiver may obtain pseudorange and carrier phase measurements (302). The GNSS receiver may obtain the pseudorange and carrier phase measurements from a pair of antennas for a current measurement epoch. Each antenna may be installed on a vehicle, and may be separated by a known baseline length or distance. The pseudorange measurement may be an estimated distance between the antenna and the satellite. The carrier phase measurement may be a number of cycles in the signal between the antenna and the satellite.

A line-replaceable unit (LRU) may estimate carrier phase ambiguities (304). The estimated carrier phase ambiguities may be floating values (e.g., non-integer values) for the current measurement epoch. LRU may estimate the carrier phase ambiguities using the known baseline length between the pair of antennas and a linearized measurement model. The linearized measurement model may relate the pseudorange measurements and the carrier phase measurements from the GNSS receiver to the carrier phase ambiguities for the satellite and the heading and the pitch of the vehicle.

The LRU may determine carrier phase integer ambiguities (306). Each of the carrier phase integer ambiguities may be an integer value for the current measurement epoch. The LRU may apply a resampling technique on the estimated carrier phase ambiguities to calculate the carrier phase integer ambiguities. The resamping techniques may include a jackknifing technique, a bootstrapping technique, a cross-validation technique, or permutation test, among others. In calculating the carrier phase integer ambiguities, the LRU may calculate wrong fixes, a wrong fix bias, and/or probability of almost fixed (PAF) values.

The LRU may store or accumulate data over successive measurement epochs.

The data may include the carrier phase integer ambiguities. For example, the LRU may store, in memory, a set of carrier phase integers if a wrong fix bias for the current measurement epoch is less than a defined threshold. The LRU may store, in memory, the set of carrier phase integer ambiguities if the corresponding PAF value is greater than a defined integrity threshold. The LRU may store the data for a current measurement epoch, including the set of carrier phase integer ambiguities, the set of assumed wrong fixes of the set of carrier phase integer ambiguities, and the corresponding PAF value, for the current measurement epoch.

Using the data of previous measurement epochs, the LRU may correct the carrier phase measurements (308) of the current measurement epoch. For instance, the LRU may determine, from accumulated data comprising the data stored for the current measurement epoch and data stored for at least one previous measurement epoch, a set of updated carrier phase integer ambiguities. The LRU may correct the carrier phase measurements obtained in the current measurement epoch, using the set of updated carrier phase integer ambiguities. The LRU may identify data corresponding to the measurement epoch with the lowest wrong fix bias. Based on the data, the LRU may update the carrier phase integer ambiguities, carrier phase ambiguities, wrong fixes, and the wrong fix bias for the current measurement epoch. The LRU may compute a vehicle heading (310). Using the corrected phase measurements, the LRU may calculate a new vehicle heading.

The LRU may identify, from the accumulated data, a measurement epoch with a smallest wrong fix bias. The LRU may retrieve from the accumulated data, a set of assumed wrong fixes corresponding to the measurement epoch identified with the smallest wrong fix bias. The LRU may determine an updated wrong fix bias for space vehicle (SV) geometry of the current measurement epoch, using the retrieved set of assumed wrong fixes. The LRU may determine a heading protection level using the updated wrong fix bias. The LRU may apply the vehicle's calculated heading to a navigation or positioning application of the vehicle, responsive to the heading protection level being less than a predefined threshold.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:
1. A line replaceable unit, comprising:
a processor and a memory, the memory including program instructions executable by the processor;
wherein the line replaceable unit is configured to be communicatively coupled with one or more components of a vehicle, the vehicle comprising a pair of antennas separated by a known baseline length, the vehicle further comprising a GNSS receiver configured to obtain pseudorange and carrier phase measurements for GNSS satellites within view of the pair of antennas based on signals received from the pair of antennas;
wherein, by the program instructions, the line replaceable unit is configured to:
estimate carrier phase ambiguities and a two-dimensional vector of the vehicle's heading and pitch, using the known baseline length and a linearized measurement model relating the pseudorange and carrier phase measurements to the carrier phase ambiguities, the heading and the pitch;
determine a set of carrier phase integer ambiguities using the estimated carrier phase ambiguities;
determine a set of assumed wrong fixes of the set of carrier phase integer ambiguities and a corresponding probability of almost fixed (PAF) value;
store, in the memory, data for the current measurement epoch, comprising the set of carrier phase integer ambiguities;
determine, from accumulated data comprising the data stored for the current measurement epoch and data stored for at least one previous measurement epoch, a set of updated carrier phase integer ambiguities;

correct the carrier phase measurements obtained in the current measurement epoch, using the set of updated carrier phase integer ambiguities; and compute the vehicle's heading using the corrected carrier phase measurements.

2. The line replaceable unit of claim 1, wherein the GNSS receiver is configured to obtain the pseudorange and carrier phase measurements using a single GNSS frequency or using two GNSS frequencies.

3. The line replaceable unit of claim 1, wherein the line replaceable unit is configured to store, in the memory, the set of carrier phase integers if a wrong fix bias for the current measurement epoch is less than a defined threshold.

4. The line replaceable unit of claim 1, wherein the line replaceable unit is configured to store, in the memory, the set of carrier phase integer ambiguities if the corresponding PAF value is greater than a defined integrity threshold.

5. The line replaceable unit of claim 1, wherein the line replaceable unit is configured to store the data for the current measurement epoch by storing the set of carrier phase integer ambiguities, the set of assumed wrong fixes of the set of carrier phase integer ambiguities, and the corresponding PAF value.

6. The line replaceable unit of claim 5, wherein the line replaceable unit is further configured to identify, from the accumulated data, a measurement epoch with a smallest wrong fix bias.

7. The line replaceable unit of claim 6, wherein the line replaceable unit is further configured to retrieve from the accumulated data, a set of assumed wrong fixes corresponding to the measurement epoch identified with the smallest wrong fix bias.

8. The line replaceable unit of claim 7, wherein the line replaceable unit is further configured to determine an updated wrong fix bias for space vehicle (SV) geometry of the current measurement epoch, using the retrieved set of assumed wrong fixes.

9. The line replaceable unit of claim 8, wherein the line replaceable unit is further configured to determine a heading protection level using the updated wrong fix bias.

10. The line replaceable unit of claim 9, wherein the line replaceable unit is further configured to apply the vehicle's heading to a navigation or positioning application of the vehicle, responsive to the heading protection level being less than a predefined threshold.

* * * * *